US008727071B2

(12) United States Patent
Berker et al.

(10) Patent No.: US 8,727,071 B2
(45) Date of Patent: May 20, 2014

(54) SOUND BARRIER FOR AUDIBLE ACOUSTIC FREQUENCY MANAGEMENT

(75) Inventors: Ali Berker, Saint Paul, MN (US); Joon Chatterjee, Bloomington, MN (US); Richard W. Greger, Saint Paul, MN (US); Marie Aloshyna ep Lesuffleur, Woodbury, MN (US); Sanat Mohanty, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 72 days.

(21) Appl. No.: 13/375,682

(22) PCT Filed: Jun. 22, 2010

(86) PCT No.: PCT/US2010/039470
§ 371 (c)(1),
(2), (4) Date: Dec. 1, 2011

(87) PCT Pub. No.: WO2010/151533
PCT Pub. Date: Dec. 29, 2010

(65) Prior Publication Data
US 2012/0090916 A1    Apr. 19, 2012

Related U.S. Application Data

(60) Provisional application No. 61/220,261, filed on Jun. 25, 2009.

(51) Int. Cl.
*E04B 1/82* (2006.01)

(52) U.S. Cl.
USPC .......................................... 181/292; 181/286

(58) Field of Classification Search
USPC .................................................. 181/292, 286
See application file for complete search history.

(56) References Cited

U.S. PATENT DOCUMENTS

| 3,948,009 A | 4/1976 | Bernhard |
| 4,709,781 A | 12/1987 | Scherzer |
| 5,188,123 A | 2/1993 | Gardner, Jr. |

(Continued)

FOREIGN PATENT DOCUMENTS

| CN | 1635705 | 7/2005 |
| CN | 1797541 | 7/2006 |

(Continued)

OTHER PUBLICATIONS

Baird et al., "Wave propagation in a viscoelastic medium containing fluid-filled microspheres," J. Acoust. Soc. Am., vol. 105, No. 3, pp. 1527-1538 (Mar. 1, 1999).

(Continued)

*Primary Examiner* — David Warren
*Assistant Examiner* — Christina Russell
(74) *Attorney, Agent, or Firm* — Steven A. Skolnick; Adam Bramwell

(57) ABSTRACT

A sound barrier comprises a substantially periodic array of structures disposed in a first medium having a first density, the structures being made of a second medium having a second density different from the first density, wherein one of the first and second media is a porous medium other than a porous metal, the porous medium having a porosity of at least about 0.02, and wherein the other of the first and second media is a viscoelastic or elastic medium.

20 Claims, 8 Drawing Sheets

(56) References Cited

U.S. PATENT DOCUMENTS

| | | | |
|---|---|---|---|
| 5,203,352 | A | 4/1993 | Gardner, Jr. |
| 5,272,284 | A | 12/1993 | Schmanski |
| 5,678,363 | A | 10/1997 | Ogorchock et al. |
| 5,792,998 | A | 8/1998 | Gardner, Jr. et al. |
| 6,119,807 | A | 9/2000 | Benson, Jr. et al. |
| 6,133,173 | A | 10/2000 | Riedel et al. |
| 7,249,653 | B2 | 7/2007 | Sheng et al. |
| 7,789,197 | B2 | 9/2010 | Duval |
| 7,837,008 | B1 | 11/2010 | Lane et al. |
| 2002/0045040 | A1 | 4/2002 | Kanada et al. |
| 2002/0117351 | A1* | 8/2002 | Chen ............... 181/292 |
| 2003/0062012 | A1 | 4/2003 | Homsi et al. |
| 2005/0283882 | A1 | 12/2005 | Berger et al. |
| 2006/0101749 | A1 | 5/2006 | Aota et al. |
| 2007/0101679 | A1* | 5/2007 | Harthcock et al. ........... 52/782.1 |
| 2007/0143907 | A1 | 6/2007 | Hansson et al. |
| 2008/0099117 | A1 | 5/2008 | Tanno |
| 2008/0128202 | A1* | 6/2008 | Palumbo et al. ............. 181/292 |
| 2008/0257642 | A1* | 10/2008 | Yamagiwa et al. ........... 181/292 |
| 2008/0264715 | A1 | 10/2008 | Leong et al. |
| 2009/0250293 | A1* | 10/2009 | Gleine et al. ................ 181/292 |
| 2010/0288580 | A1* | 11/2010 | Berker et al. ................ 181/210 |
| 2011/0000741 | A1* | 1/2011 | Berker et al. ................ 181/296 |
| 2011/0005859 | A1* | 1/2011 | Berker et al. ................ 181/224 |
| 2011/0100746 | A1* | 5/2011 | Berker et al. ................ 181/286 |
| 2011/0247893 | A1* | 10/2011 | Berker et al. ................ 181/286 |
| 2011/0253153 | A1* | 10/2011 | Berker et al. ................ 128/866 |
| 2012/0155688 | A1* | 6/2012 | Wilson ......................... 381/354 |
| 2013/0022307 | A1* | 1/2013 | Kilic et al. ..................... 385/12 |

FOREIGN PATENT DOCUMENTS

| | | |
|---|---|---|
| CN | 101221755 | 7/2008 |
| EP | 1 859 928 | 11/2007 |
| JP | 61-144109 | 7/1986 |
| JP | 02298619 A * | 12/1990 ............... F01N 1/24 |
| JP | 06-032939 | 2/1994 |
| JP | 06-169498 | 6/1994 |
| JP | 2003-308074 | 10/2003 |
| JP | 2006-106211 | 4/2006 |
| JP | 2006-257993 | 9/2006 |
| JP | 2006-284658 | 10/2006 |
| JP | 2006-335938 | 12/2006 |
| JP | 2007-015292 | 1/2007 |
| JP | 2009-500230 | 1/2009 |
| KR | 10-0618744 | 8/2006 |
| KR | 10-0995605 | 11/2010 |
| WO | 2006-021004 | 2/2006 |
| WO | 2006-088000 | 8/2006 |
| WO | 2006-116440 | 11/2006 |
| WO | 2006-119895 | 11/2006 |
| WO | 2007/050536 | 5/2007 |

OTHER PUBLICATIONS

Goffaux et al., "Comparison of the sound attenuation efficiency of locally resonant materials and elastic band-gap structures," Physical Review B, vol. 70, 184302-1-184302-6 (Nov. 18, 2004).

Hsu et al., "Lamb waves in binary locally resonant phononic plates with two-dimensional lattices," Applied Physics Letters, vol. 90, No. 20, pp. 201904-1-201904-3, ISSN: 0003-6951 (May 15, 2007).

Ivansson et al., "Sound absorption by viscoelastic coatings with periodically distributed cavities", Journal of the Acoustical Society of America, vol. 119, No. 6, pp. 3558-3567, 2006.

Ko et al., "Application of Elastomeric material to the reduction of turbulent boundary layer pressure fluctuations (Three-Dimensional Analysis)," J. of Sound and Vibration, vol. 159, No. 3, pp. 469-481 (Dec. 22, 1992).

Lambin et al., "Stopping of acoustic waves by sonic polymer-fluid composites," Phys. Rev. E, vol. 63, pp. 066605-1-066605-6 (May 22, 2001).

Liu et al., "Locally Resonant Sonic Materials", Science Magazine, vol. 289, pp. 1734-1736 (Sep. 8, 2000).

Merheb et al., "Elastic and viscoelastic effects in rubber/air acoustic band gap structures: a theoretical and experimental study", Journal of Applied Physics, 104 6 (2008), p. 064913.

Olivieri et al., "Measurement of transmission loss of materials using a standing wave tube," Inter-Noise 2006, Dec. 3-6, 2006, Honolulu, Hawaii USA.

Psarobas, "Viscoelastic response of sonic band-gap materials," Phys. Rev. B vol. 64, pp. 012303-1-012303-4 (Jun. 15, 2001).

Robert et al., "Propagation of elastic waves through two-dimensional lattices of cylindrical empty or water-filled inclusions in an aluminum matrix", Ultrasonics. Dec. 2006;45(1-4):178-87.

Sigalas et al., Classical vibrational modes in phononic lattices: theory and experiment. Zeitschrift für Kristallographie: vol. 220, Issue 9-10 Phononic Crystals—Sonic Band-Gap Materials, pp. 765-809.

Tanaka et al., "Band structure of acoustic waves in phononic lattices: Two-dimensional composites with large acoustic mismatch." Physical Review B, vol. 61, No. 11, pp. 7387-7392 (Mar. 2000).

U.S. Department of Transportation, Federal Aviation Administration, Advisory Circular No. 25.856-1, "Thermal/Acoustic Insulation Flame Propagation Test Method Details," Jun. 24, 2005.

Vasseur et al., "Experimental evidence for the existence of absolute acoustic band gaps in two-dimensional periodic composite media", Journal Physics: Condens, Matter 10, PII: S0953-8984(98)93210-6, pp. 6051-6064 (Apr. 9, 1998).

Vasseur et al., "Phononic crystal with low filling fraction and absolute acoustic band gap in the audible frequency range: A theoretical and experimental study," Phys. Rev. E 65, 056608-1-056608-6 (May 2, 2002).

Zeng et al., "Sound isolation of composite structure consisting of multi phononic crystals.", J. of Vibration and Shock 26/1, 80 (2007).

Zhao et al., "Dynamics and sound attenuation in viscoelastic polymer containing hollow glass microspheres," J. of Applied Physics., vol. 101, No. 12, pp. 123518-1-123518-3 (Jun. 25, 2007).

\* cited by examiner

SOUND BARRIER FOR AUDIBLE ACOUSTIC FREQUENCY MANAGEMENT

CROSS REFERENCE TO RELATED APPLICATIONS

This application is a national stage filing under 35 U.S.C. 371 of PCT/US2010/039470, filed Jun. 22, 2010, which claims priority to U.S. Provisional Application No. 61/220,261, filed Jun. 25, 2009, the disclosure of which is incorporated by reference in its/their entirety herein.

STATEMENT OF PRIORITY

This application claims the priority of U.S. Provisional Application No. 61/220,261 filed Jun. 25, 2009, the contents of which are hereby incorporated by reference.

FIELD

This invention relates to sound barriers and, in other aspects, to processes for preparing sound barriers and processes for their use in sound insulation.

BACKGROUND

Sound proofing materials and structures have important applications in the acoustic industry. Traditional materials used in the industry, such as absorbers and reflectors, are usually active over a broad range of frequencies without providing frequency selective sound control. Active noise cancellation equipment allows for frequency selective sound attenuation, but it is typically most effective in confined spaces and requires an investment in, and operation of, electronic equipment to provide power and control.

Traditional sound-absorbing materials (for example, foams or fibrous materials) are generally relatively light in weight and porous and serve to dissipate the vibration energy of sound waves over their relatively large surface areas. Helmholtz resonators (comprising, for example, a layer of air sandwiched between two elastic substrates) can also be employed as sound absorbers. For both types of absorbers, however, relatively thick structures are generally required in order to obtain relatively good absorption characteristics at relatively low audible frequencies (for example, approximately 50 millimeters (mm) thickness for frequencies less than about 500 hertz (Hz)), and such thick structures can be problematic for use in confined spaces.

In contrast with the traditional sound-absorbing materials, traditional sound barriers tend to be relatively heavy and air-tight because the sound transmission loss from a material is generally a function of its mass and stiffness. The so-called "mass law" (applicable to many traditional acoustic barrier materials in certain frequency ranges) dictates that as the weight per unit area of a material is doubled, the transmission loss through the material increases by 6 decibels (dB). The weight per unit area can be increased by using denser materials or by increasing the thickness of the barrier. Added weight, however, can be undesirable in many applications.

Phononic crystals (that is, periodic inhomogeneous media, typically in the form of elastic/elastic or elastic/fluid constructions) have been proposed as sound barriers with acoustic passbands and band gaps. Such structures can generate acoustic band gaps in a passive, yet frequency selective way, without having to rely on viscous dissipation or resonance as the leading physical mechanism. Instead, the transmission loss is due to Bragg scattering, which results from the sound speed contrast between the two or more components of an inhomogeneous, multi-phase, spatially periodic structure.

For example, periodic arrays of copper tubes in air, periodic arrays of composite elements having high density centers covered in elastically soft material (to provide an array of localized resonant structures), and periodic arrays of water in air have been proposed to create sound barriers with frequency-selective characteristics. These approaches have typically suffered, however, from drawbacks such as the production of narrow band gaps, the production of band gaps at frequencies too high (for example, ultrasound frequencies of 20 kHz or higher) for audio applications, and/or the need for bulky and/or heavy physical structures (for example, metal pipes having diameters of several centimeters arranged in arrays having external dimensions of decimeters or meters).

SUMMARY

Thus, we recognize that there is a need for sound barriers that can be at least partially effective at audible acoustic frequencies (reducing or, preferably, eliminating sound transmission) while being relatively small in external dimensions and/or relatively light in weight. Preferably, the sound barriers can be at least partially effective over a relatively broad range of audible frequencies and/or can be relatively simply and cost-effectively prepared.

Briefly, in one aspect, this invention provides such a sound barrier, which comprises a substantially periodic array of structures disposed in a first medium having a first density, the structures being made of a second medium having a second density different from the first density, wherein one of the first and second media is a porous medium other than a porous metal, the porous medium having a porosity of at least about 0.02, and wherein the other of the first and second media is a viscoelastic or elastic medium. Preferably, the viscoelastic or elastic medium is a substantially non-porous medium (that is, the medium has a porosity less than about 0.02), and/or the substantially periodic array of structures is a one-dimensional array in the form of a multi-layer structure comprising alternating layers of the first and second media. The sound barrier can optionally further comprise other porous, elastic, and/or viscoelastic media that are different from the first and/or second media.

It has been discovered that, by selecting porous materials having certain characteristics and combining them with viscoelastic or elastic materials to form spatially periodic arrays, phononic crystal structure band gaps or at least significant transmission losses (for example, greater than 20 decibels (dB)) can be obtained in at least portions of the audible range (that is, the range of 20 hertz (Hz) to 20 kilohertz (kHz)). Surprisingly, such structures provide transmission losses that can exceed their theoretical mass law transmission loss values (based on the weight of the structure per unit area).

The structures can be relatively light in weight and relatively small (for example, having external dimensions on the order of a few centimeters or less). By controlling such design parameters as the selection of materials, the type of lattice structure, the spacing of the different materials, and so forth, the frequency of the band gap, the number of gaps, and their widths can be tuned, or, at a minimum, the transmission loss levels can be adjusted as a function of frequency.

The phononic crystal structures can generate acoustic band gaps in a passive, yet frequency selective way. Unlike the most common sound absorbers used in the acoustics industry, phononic crystals control sound in transmission mode. Within the range of frequencies of the band gap, there can be essentially no transmission of an incident sound wave through the structure. The band gap is not always absolute (that is, no sound transmission), but the sound transmission loss can often be on the order of 20 decibels (dB) or more. In the acoustic industry, attenuations on the order of 3 dB are considered significant, so 20+dB is a very significant loss in transmission, approaching 100 percent reduction in acoustic power.

Phononic crystal structures can be placed between a sound source and a receiver to allow only select frequencies to pass through the structure. The receiver thus hears filtered sound, with undesirable frequencies being blocked. By properly configuring the phononic crystal structure, the transmitted frequencies can be focused at the receiver, or the undesirable frequencies can be reflected back to the sound source (much like a frequency selective mirror). Unlike current acoustic materials, the phononic crystal structures can be used to actually manage sound waves, rather than simply to attenuate or reflect them.

Thus, in at least some embodiments, the sound barrier of the invention can meet the above-cited need for sound barriers that can be at least partially effective at audible acoustic frequencies while being relatively small in external dimensions and/or relatively light in weight. The sound barrier of the invention can be used to provide sound insulation in a variety of different environments including buildings (for example, homes, offices, hospitals, and so forth), highway sound barriers, transportation vehicles, hearing protection devices, and the like.

In another aspect, this invention also provides a process for preparing a sound barrier. The process comprises (a) providing a first medium having a first density; (b) providing a second medium having a second density that is different from the first density; and (c) forming a substantially periodic array of structures disposed in the first medium, the structures being made of the second medium; wherein one of the first and second media is a porous medium other than a porous metal, the porous medium having a porosity of at least about 0.02, and wherein the other of the first and second media is a viscoelastic or elastic medium.

In yet another aspect, this invention further provides a sound insulation process. The process comprises (a) providing a sound barrier comprising a substantially periodic array of structures disposed in a first medium having a first density, the structures being made of a second medium having a second density different from the first density, wherein one of the first and second media is a porous medium other than a porous metal, the porous medium having a porosity of at least about 0.02, and wherein the other of the first and second media is a viscoelastic or elastic medium; and (b) interposing the sound barrier between an acoustic source (preferably, a source of audible acoustic frequencies) and an acoustic receiver (preferably, a receiver of audible acoustic frequencies).

BRIEF DESCRIPTION OF DRAWING

These and other features, aspects, and advantages of the present invention will become better understood with regard to the following description, appended claims, and accompanying drawing, wherein:

DETAILED DESCRIPTION

Viscoelastic and Elastic Materials

Figure 1A:
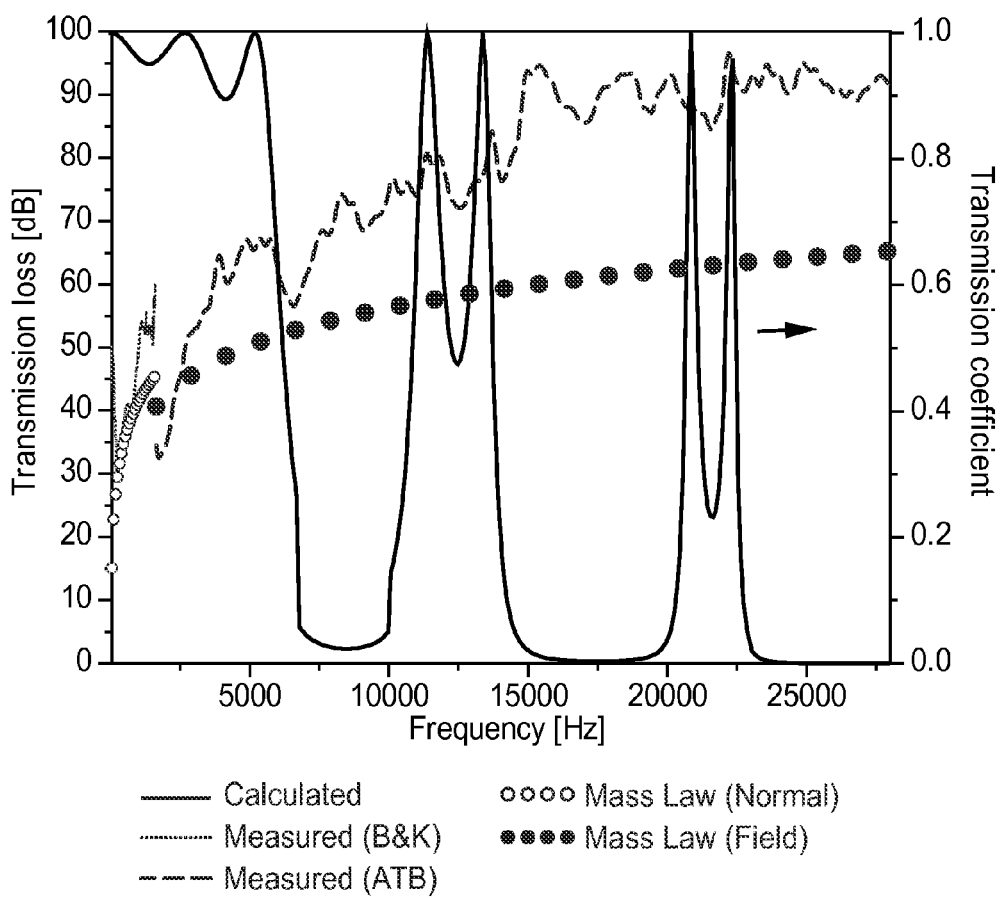
FIGS. 1a and 1b are plots of transmission loss (in dB; measured and theoretical mass law values) and transmission coefficient (calculated) versus frequency (in Hz) for the embodiment of the sound barrier of the invention described in Example 1.

Materials that are suitable for use as the above-referenced viscoelastic component(s) of the sound barrier of the invention include viscoelastic solids and liquids. The viscoelastic materials can be porous but are preferably substantially non-porous (that is, have a porosity of less than about 0.02). Such substantially non-porous materials can exhibit some porosity in the form of, for example, surface imperfections or an occasional internal inclusion, but are generally non-porous. Preferred viscoelastic materials include those having (preferably, at least in the audible range of acoustic frequencies) a speed of propagation of longitudinal sound wave that is at least about 30 times (preferably, at least about 50 times; more preferably, at least about 75 times; most preferably, at least about 100 times) its speed of propagation of transverse sound wave.

Useful viscoelastic solids and liquids include those having a steady shear plateau modulus ($G°_N$) of less than or equal to about $5 \times 10^6$ Pascals (Pa) at ambient temperatures (for example, about 20° C.), the steady shear plateau modulus preferably extending from about 30 Kelvin degrees to about 100 Kelvin degrees above the glass transition temperature ($T_g$) of the material. Preferably, at least one of the viscoelastic materials in the sound barrier has a steady shear plateau modulus of less than or equal to about $1 \times 10^6$ Pa (more preferably, less than or equal to about $1 \times 10^5$ Pa) at ambient temperatures (for example, about 20° C.).

Examples of such viscoelastic materials include rubbery polymer compositions (for example, comprising lightly-crosslinked or semi-crystalline polymers) in various forms including elastomers (including, for example, thermoplastic elastomers), elastoviscous liquids, and the like, and combinations thereof (preferably, for at least some applications, elastomers and combinations thereof). Useful elastomers include both homopolymers and copolymers (including block, graft, and random copolymers), both inorganic and organic polymers and combinations thereof, and polymers that are linear or branched, and/or that are in the form of interpenetrating or semi-interpenetrating networks or other complex forms (for example, star polymers). Useful elastoviscous liquids include polymer melts, solutions, and gels (including hydrogels).

Preferred viscoelastic solids include silicone rubbers (preferably, having a durometer hardness of about 20 A to about 70 A; more preferably, about 30 A to about 50 A), (meth)acrylate (acrylate and/or methacrylate) polymers (preferably, copolymers of isooctylacrylate (IOA) and acrylic acid (AA)), ethylene-vinyl acetate (EVA) copolymers, block copolymers (preferably, comprising styrene, ethylene, and butylene), cellulosic polymers (preferably, cork), blends of organic polymer (preferably, a polyurethane) and polydiorganosiloxane polyamide block copolymer (preferably, a silicone polyoxamide block copolymer), neoprene, and combinations thereof. Preferred viscoelastic liquids include mineral oil-modified block copolymers, hydrogels, and combinations thereof.

Such viscoelastic solids and liquids can be prepared by known methods. Many are commercially available.

Materials that are suitable for use as the above-referenced elastic component(s) of the sound barrier of the invention include essentially all elastic materials. The elastic materials can be porous but are preferably substantially non-porous (that is, having a porosity of less than about 0.02). Such substantially non-porous materials can exhibit some porosity in the form of, for example, surface imperfections or an occasional internal inclusion but are generally non-porous. Preferred elastic materials include those having a longitudinal speed of sound that is at least about 2000 meters per second (m/s).

Useful classes of elastic solids include metals (and alloys thereof), glassy polymers (for example, cured epoxy resin), composite materials (for example, glass, metal, or carbon fibers (or another particulate form such as flakes or powder) in a polymer matrix), and the like, and combinations thereof. Preferred classes of elastic solids include metals, metal alloys, glassy polymers, and combinations thereof (more preferably, copper, aluminum, epoxy resin, copper alloys, aluminum alloys, and combinations thereof even more preferably, copper, aluminum, copper alloys, aluminum alloys, and combinations thereof yet more preferably, aluminum, aluminum alloys, and combinations thereof most preferably, aluminum).

Such elastic materials can be prepared or obtained by known methods. Many are commercially available.

Porous Materials

Materials that are suitable for use as the above-referenced porous component(s) of the sound barrier of the invention include multi-phase materials (other than porous metals) that comprise a solid or liquid matrix material or a combination thereof (for example, a gel) comprising vacuum- or fluid-containing pores (for example, cavities, interstices, inclusions, or the like) and that have a porosity of at least about 0.02. Preferably, the matrix material is a solid or a gel (more preferably, a solid), and/or the pores are at least partially filled (more preferably, totally filled) with at least one fluid (that is, with a liquid or a gas; preferably, a gas). Useful fluids include air, water vapor, nitrogen, carbon dioxide, liquid water, and the like, and combinations thereof. The porous material can optionally further comprise a vacuum- or fluid-containment material (for example, in the form of glass or polymeric microspheres that can contain gas).

The solid matrix material can comprise essentially any viscoelastic or elastic material, with the proviso that elemental metals can be present only as fillers in a polymeric matrix. Preferably, the viscoelastic or elastic material can exhibit essentially no creep or only minimal creep (preferably, exhibiting a steady shear creep compliance, $J(t)$, less than about $10^{-6}$ Pa$^{-1}$, more preferably, less than about $10^{-7}$ Pa$^{-1}$) under use conditions, so as to avoid significant filling of the pores with matrix material.

Useful viscoelastic and elastic matrix materials include those described above. Preferred elastic materials include those having a longitudinal speed of sound that is at least about 2000 meters per second (m/s). Preferred elastic matrix materials include inorganic materials (for example, ceramics such as crystalline oxides (including those based, for example, on alumina or silica and more traditional clay-based ceramics) and glasses (including, for example, silica-based glasses); cured, glassy, or crystalline polymer resins (for example, cured epoxy resins); relatively highly-crosslinked elastomers (for example, rubbers having a durometer hardness value of at least about Shore 60 A, including acrylonitrile butadiene rubber, ethylene propylene diene M-class rubber (EPDM rubber), polychloroprene rubber, styrene butadiene rubber, and relatively highly-vulcanized olefin rubbers); thermoplastic polymers that are relatively glassy, crystalline, or a combination thereof under use conditions (for example, under ambient conditions (for example, about 23° C. and about 1 atmosphere), polyolefins such as polypropylene; polystyrene; polycarbonates; and polyesters); and the like; and combinations thereof. Preferred viscoelastic matrix materials include relatively moderately-crosslinked elastomers (for example, rubbers having a durometer hardness value of at least about Shore 40 A to about Shore 59 A, including silicones and acrylates); thermoplastic polymers that are relatively rubbery under use conditions (for example, under ambient conditions (for example, about 23° C. and about 1 atmosphere), polyethylene; and copolymers of ethylene and vinyl acetate (EVA copolymers)); and the like; and combinations thereof. Combinations of elastic and viscoelastic materials can be utilized, if desired.

The pores within the solid matrix material can be of essentially any shape and size. The pores can be the same or can vary in shape and/or size. Useful sizes can range, for example, from about 10 micrometers to several millimeters; useful shapes include spherical, ellipsoidal, polygonal with flat or curved surfaces and with sharp or curved vertices, and the like, and combinations thereof. In addition, the spatial arrangement of the pores within the solid matrix material can be completely random or can be partially or fully periodic (preferably, partially periodic). Any variations in shape, size, or spacing of the pores can be asymmetrical or symmetrical (preferably, symmetrical) within the matrix material. Some or all of the pores can be enclosed or completely surrounded by the solid matrix material (for example, as the inclusions in a "closed-cell foam") or, somewhat less preferably, can be in contact with some or all of the other pores and/or with the exterior surface of the matrix (for example, as in an "open-cell foam").

The solid matrix material can be continuous or discontinuous. For example, a discontinuous solid matrix material can comprise discrete particles (for example, fibers or powder) that are in contact with each other so as to form pores in the form of interstices. The particles can be the same or can vary in size, shape, and/or chemical composition, and their spatial arrangement can be random or can be partially or fully periodic. The particles can be porous particles, substantially non-porous particles, or a combination thereof.

The total pore volume of the porous medium divided by the sum of the total pore volume and the total solid matrix material volume (that is, the total volume of the porous medium) defines the "porosity" of the medium. The porosity is a dimensionless number between zero and one (excluding the limits that correspond to pure solid and gas phases, respectively). Porous media useful in preparing the sound barrier of the invention include those having porosities of about 0.02 to about 0.99 (preferably, about 0.02 to about 0.65; more preferably, about 0.03 to about 0.2 and about 0.4 to about 0.65; even more preferably, about 0.04 to about 0.18 and about 0.42 to about 0.62; most preferably, about 0.05 to about 0.15 and about 0.45 to about 0.6).

The "bulk density" of the porous medium can be defined as the total mass of the porous medium divided by its total volume. The bulk density (ρ) is related to the solid density (ρ$_s$), fluid density (ρ$_g$), and the porosity (φ) via the following equation:

$$\rho = \phi \rho_g + (1-\phi)\rho_s$$

Porous media useful in preparing the sound barrier of the invention include those having bulk densities that are greater than zero and less than about 3000 kg/m$^3$ (preferably, greater than about 1.0 and less than about 2900 kg/m$^3$; more preferably, greater than about 1.5 and less than about 2800 kg/m$^3$; most preferably, greater than about 2.0 and less than about 2600 or 2700 kg/m$^3$).

The above-described porous materials or media can be prepared by known methods, and some are commercially available. Preferred porous media include polymer foams (preferably, closed-cell polymer foams; for example, closed-cell polyethylene foam), polymeric nonwoven materials (for example, polyolefin nonwoven materials), porous silica materials (for example, perlite and aerogel), porous composite materials (for example, perlite or gas-containing polymeric microspheres in a polymer matrix), and combinations thereof. More preferred porous media include closed-cell polymer foams, polymeric nonwoven materials, porous silica materials, and combinations thereof (even more preferably, closed-cell polymer foams, polymeric nonwoven materials, and combinations thereof; most preferably, polymeric nonwoven materials and combinations thereof).

If desired, the sound barrier of the invention can optionally comprise other component materials. For example, the sound barrier can include more than one viscoelastic material (including one or more viscoelastic materials that do not have a speed of propagation of longitudinal sound wave that is at least about 30 times its speed of propagation of transverse sound wave, which can be used either as one of the first and second media or as an additional medium), more than one elastic material, and/or more than one porous material (including one or more porous materials that are different from the above-described porous materials (for example, a porous metal), provided that at least one of the above-described porous materials is included in the sound barrier as described above).

Preparation of Phononic Crystal Structure

The sound barrier of the invention comprises a substantially periodic (one-, two-, or three-dimensional) array of structures disposed in a first medium having a first density, the structures being made of a second medium having a second density different from the first density, as described above. Such an array can be formed by using either an above-described porous material or an above-described viscoelastic or elastic material as the first medium and the other of the two as the second medium.

The resulting structure or phononic crystal can be a macroscopic construction (for example, having a size scale on the order of centimeters or millimeters or less). If desired, the phononic crystal can take the form of a spatially periodic lattice with uniformly-sized and uniformly-shaped inclusions at its lattice sites, surrounded by a material that forms a matrix between the inclusions. Design parameters for such structures include the type of lattice (for example, square, triangular, and so forth), the spacing between the lattice sites (the lattice constant), the make-up and shape of the unit cell (for example, the fractional area of the unit cell that is occupied by the inclusions—also known as f, the so-called "fill factor"), the physical properties of the inclusion and matrix materials (for example, density, Poisson ratio, modulus, and so forth), the shape of the inclusion (for example, rod, sphere, hollow rod, square pillar, and so forth), and the like. By controlling such design parameters, the frequency of the resulting band gap, the number of gaps, and their widths can be tuned, or, at a minimum, the level of transmission loss can be adjusted as a function of frequency.

Preferably, the substantially periodic array of structures is a one-dimensional array in the form of a multi-layer structure comprising alternating layers of the first and second media (and, if desired, further comprising one or more of the above-described optional components in the form of one or more layers; for example, an "ABCD" structure, an "ACDB" structure, an "ACBD" structure, and so forth can be formed from the first (A) and second (B) media and two additional components C and D). The total number of layers of the multi-layer structure can vary over a wide range, depending upon the particular materials that are utilized, the layer thicknesses, and the requirements of a particular acoustic application.

For example, the total number of layers of the multi-layer structure can range from as few as two layers to as high as hundreds of layers or more. Layer thicknesses can also vary widely (depending upon, for example, the desired periodicity) but are preferably on the order of centimeters or less (more preferably, on the order of millimeters or less; most preferably, less than or equal to about 10 mm). Such layer thicknesses and numbers of layers can provide phononic crystal structures having dimensions on the order of centimeters or less (preferably, less than or equal to about 100 mm; more preferably, less than or equal to about 50 mm; even more preferably, less than or equal to about 30 mm; most preferably, less than or equal to about 20 mm). If desired, the layers can be cleaned (for example, using surfactant compositions or isopropanol) prior to assembly of the structure, and one or more bonding agents (for example, adhesives or mechanical fasteners) can optionally be utilized (provided that there is no significant interference with the desired acoustics).

A preferred embodiment of the multi-layer structure comprises from about 3 to about 10 or 20 (more preferably, from about 3 to about 5) alternating layers of porous material (preferably, closed-cell polymer foams, polymeric nonwoven materials, porous silica materials, or a combination thereof) having a layer thickness of about 5 mm to about 10 mm and an elastic material (preferably, aluminum, epoxy resin, aluminum alloy, or a combination thereof) having a layer thickness of about 0.025 mm to about 1 mm. This can provide a phononic crystal structure having preferred dimensions on the order of about 5 mm to about 100 mm (more preferably, about 10 mm to about 60 mm; even more preferably, about 10 mm to about 50 mm; most preferably, about 10 mm to about 30 mm).

Sound Barrier and its Use

The sound barrier of the invention can be used in a sound insulation process comprising interposing or placing the sound barrier between an acoustic source (preferably, a source of audible acoustic frequencies) and an acoustic receiver (preferably, a receiver of audible acoustic frequencies). Useful acoustic sources include traffic noise, industrial noise, conversation, music, and the like (preferably, noises or other sounds having an audible component; more preferably, noises or other sounds having a frequency component in the range of about 500 Hz to about 1500 Hz). The acoustic receiver can be, for example, a human ear, any of various recording devices, and the like (preferably, the human ear). If desired, the sound barrier can be used as an acoustic absorber (for example, by positioning the sound barrier relative to a substrate such that it can function as a Helmholtz resonator-type absorber).

The sound barrier of the invention can be used to achieve transmission loss across a relatively large portion of the audible range (with preferred embodiments providing a transmission loss that is greater than or equal to about 20 dB across the range of about 800 Hz to about 1500 Hz; with more preferred embodiments providing a transmission loss that is greater than or equal to about 20 dB across the range of about 500 Hz to about 1500 Hz; with even more preferred embodiments providing a transmission loss that is greater than or equal to about 20 dB across the range of about 250 Hz to about 1500 Hz; and with most preferred embodiments providing substantially total transmission loss across at least a portion of the range of about 500 Hz to about 1500 Hz). Such transmission losses can be achieved while maintaining phononic crystal structure dimensions on the order of centimeters or less (preferably, less than or equal to about 20 cm; more preferably, on the order of about 10 cm or less; most preferably, on the order of about 10 mm to about 30 mm).

In addition to one or more of the above-described phononic crystal structures, the sound barrier of the invention can optionally further comprise one or more conventional or hereafter-developed sound insulators (for example, conventional absorbers, barriers, and the like). If desired, such conventional sound insulators can be layered, for example, to broaden the frequency effectiveness range of the sound barrier.

EXAMPLES

Objects and advantages of this invention are further illustrated by the following examples, but the particular materials and amounts thereof recited in these examples, as well as other conditions and details, should not be construed to unduly limit this invention. All parts, percentages, ratios, and the like in the examples are by weight, unless noted otherwise. Solvents and other reagents were obtained from Sigma-Aldrich Chemical Company, St. Louis, Mo. unless otherwise noted.

Test Methods
Transmission Loss Measurements in the Frequency Range of 50 Hz to 1.6 kHz Transmission loss measurements were carried out by using a Brüel & Kjaer Impedance Tube System Type 4206 (100 mm tube, Brüel & Kjaer Sound & Vibration Measurement A/S, Denmark). A four-microphone transfer-function test method was used for measurements of transmission loss in the frequency range of 50 Hz to 1.6 kHz.

In brief, the tube system was composed of source, holder, and receiving tubes of 100 mm internal diameter. Each test sample was set up with two rubber o-rings inside the holder tube located between the source and receiving tubes. A loudspeaker (4 ohms (Ω) impedance, 80 mm diameter) mounted at the end of the source tube was used as a generator of sound plane waves. Four 0.64 cm (¼ inch) condenser microphones of Type 4187 were used to measure the sound pressure levels on both sides of the test sample (two in the source tube and two in the receiving tube). The two microphones in the source tube were used to determine incoming and reflected plane waves. The two other microphones located in the receiving tube were used to determine absorbed and transmitted portions.

By measuring sound pressure at the four microphone locations and calculating the complex transfer function using a four-channel digital frequency analyzer according to the procedure described by Olivieri, O., Bolton, J. S., and Yoo, T. in "*Measurement of Transmission Loss of Materials Using a Standing Wave Tube*", INTER-NOISE 2006, 3-6 Dec. 2006, Honolulu, Hi., USA, the transmission loss of the test sample was determined. PULSE version 11 data acquisition and analysis software (Brüel & Kjaer) was utilized.

For each structure, a test sample was prepared. All test samples were cut with a 99.54 mm diameter precision die. Transmission loss measurements were repeated three times for each test sample. The resulting transmission loss for each structure was calculated as the arithmetical average of the three measurements.

Transmission Loss Measurements in the Frequency Range of 1,000 Hz to 25,000 Hz

Transmission loss measurements in 1,000-25,000 Hz frequency range were carried out by using an acoustic test bench box (ATB) consisting of a test chamber containing an acoustic source, a sample holder, and microphones; a digital to analog converter (DAC); a power amplifier; a microphone preamplifier; an analog to digital converter (ADC); and a personal computer (PC). LabView™ 8.0 software (available from National Instruments, Austin, Tex.) was used as the data acquisition program. The ATB was designed to have four interconnected high-level systems, each with its own detailed subsystems. The four high level systems were a user interface, signal processing, audio hardware, and the test chamber.

The user interface contained all components responsible for the transfer of information between the user and the test chamber, including test settings, test results, and control mechanisms for starting and stopping tests. The signal processing system was responsible for generating, acquiring, and processing signals. Its generation section sent a digital signal of constant frequency and amplitude to the digital to analog converter (Model PCI-6711, available from National Instruments, Austin, Tex.) for conversion to an analog signal. Its receiving section received digital signals from the analog to digital converter (Model PCI-4472, available from National Instruments, Austin, Tex.), used a band pass filter to filter out any noise, and normalized the resulting signal from calibration data.

The audio hardware was responsible for physically generating, measuring, and amplifying sound waves traveling through the test chamber. A digital signal was sent from the signal processing system to the DAC, where it was converted to an analog signal. The analog signal was sent to a custom-made power amplifier with a gain of 10×. The amplifier powered a full range speaker (Fostex™ FE-126E full range speaker, capable of producing sounds from 79 Hz to 25 kHz, available from www.fostex.com), which filled the test chamber with sound waves. An array of microphones was strategically placed throughout the test chamber to measure and record the sound waves. Two types of microphones were used: The Earthworks™ M50 measurement microphone (available from Earthworks, Inc., Milford, N.H.) and the DPA 4021 compact cardioid microphone (available from DPA Microphones, Longmont, Colo. 80501). The microphones were amplified by a professional grade microphone preamplifier (Model Millenia™ HV-3D, with 48V phantom power, available from Millenia Music and Media Systems, Placerville, Calif.). The preamplifier sent its signals into the ADC, which converted the signals from analog to digital and sent them back to the signal processing system.

The test chamber was a physical chamber that held all of the microphones, the speaker, and the test sample. It was constructed of 0.0191 meter (¾ inch) plywood with dimensions of 0.514 meter/1.212 meters/0.572 meter (20.25 inches/47.75 inches/22.5 inches) (height/length/width). The chamber consisted of a speaker box (constructed of 0.0191 meter (¾ inch) plywood with dimensions of 0.228 meter/0.165 meter/0.127 meter (9 inches/6.5 inches/5 inches) (height/length/width)) on one end, a microphone mount on the other end, six positions for hanging microphones, a standing microphone mount, and guide posts for sample holders (constructed of 0.0191 meter (¾ inch) plywood with dimensions of 0.393 meter/0.457 meter (15.5 inches/18 inches) (height/width)). Both front and back panels of the test chamber were removable for easily changing speakers and microphones. The interior of the test chamber and of each sample holder was completely lined with 3M™ Thinsulate™ Acoustic Insulation (a nonwoven polymeric mat, 0.025 meter thickness, available from 3M Company, St. Paul, Minn.) for sonic insulation.

Each test sample was held in place with two rubber O-rings or sealed with petroleum jelly inside the sample holder located between the acoustic source (speaker) and the receiving microphone in the test chamber. For each different structure, a test sample was prepared. All test samples were cut with a 99.54 mm diameter precision die. Transmission loss measurements were repeated six times for each test sample. The resulting transmission loss for each structure was calculated as the arithmetical average of the six measurements.

Speed of Sound Measurements

Speed of sound measurements were carried out by using a custom-built pulser/receiver system. In this system, a through-transmission speed of sound system configuration was used. A test sample was placed between two wave transducers (Model V101-RB Panametrics-NDT Contact Transducer, longitudinal wave, 0.5 MHz, available from Olympus NDT, Waltham, Mass.) as transmitter and receiver transducers. For each test sample, VASELINE™ petroleum jelly was applied on the surface of each transducer to ensure good connections. The transmitter and receiver transducers were connected to a pulser/receiver (Model 5077PR Ultrasonic Pulser/Receiver, available from Olympus NDT, Waltham, Mass.), which was connected to a digital oscilloscope (Model DS06054A 500 MHz, 4 channel, 6000 Series Oscilloscope, available from Agilent Technologies, Inc., Colorado Springs, Colo.). Speed of sound was measured by a time-of-flight technique at 100 kHz. For each test sample, the measurement of speed of sound was repeated three times. A speed of sound value was calculated as the arithmetical average of the three measurements.

Rheological Measurements

Rheological properties (for example, steady shear plateau modulus) were determined by carrying out linear, isothermal frequency sweep Dynamic Mechanical Analysis (DMA) tests in extensional mode on a test sample of material in a commercial ARES dynamic rheometer (available through TA Instruments of New Castle, Del.). The resulting data were then shifted using the Time-Temperature Superposition Principle to yield dynamic master curves at a selected reference temperature (taken as room temperature of 22.7° C.). The horizontal shift factors that were used for the shifting of the dynamic master curves were checked and found to obey the Williams-Landel-Ferry (WLF) form. The resulting dynamic master curves were finally converted to steady linear extensional modulus master curves at room temperature (22.7° C.) by means of the Ninomiya-Ferry (NF) procedure. The value of the rubbery tensile modulus plateau was determined from the steady linear extensional modulus master curve, and the steady shear plateau modulus of the material was taken to be one-third of the rubbery extensional modulus plateau value. (See, for example, the discussion of rheological data analysis techniques by John D. Ferry in *Viscoelastic Properties of Polymers*, $2^{nd}$ Edition, John Wiley & Sons, Inc., New York (1980).)

Materials

Material A:

Polyethylene (PE) Foam No. 1; Item Number 8722K26, a closed-cell foam, available from McMaster-Carr Inc., Elmhurst, Ill., thickness 6.35 mm.

Material B:

Polyethylene (PE) Foam No. 2; Item Number 8722K27, a closed-cell foam, available from McMaster-Carr Inc., Elmhurst, Ill., thickness 9.53 mm.

Material C:

VHB Foam: 3M™ VHB™ Acrylic Foam Tape 4611, a closed-cell foam, available from 3M Company, St. Paul, Minn., thickness 1.14 mm.

Material D:

Aluminum No. 1: Aluminum sheet, available from Alcoa Corp., Pittsburgh, Pa., thickness 0.5 mm.

Material E:

Aluminum No. 2: Aluminum foil, sold commercially under the brand name of Reynolds Wrap™, available from Alcoa Corp., Pittsburgh, Pa., thickness 0.03 mm.

Material F:

Silicone Rubber: Item Number 86915K24, with acrylic adhesive backing, available from McMaster-Carr Inc., Elmhurst, Ill., durometer hardness 40 A, thickness 0.8 mm, steady shear plateau modulus of $4.3 \times 10^5$ Pa at room temperature of 22.7° C. determined essentially as described above.

Material G:

Thermoplastic Polymer: Linear low density polyethylene, available as DOW DNDA-1081 NT 7, from The Dow Chemical Company, Midland, Mich.

Material H:

Polyolefin Elastomer: Copolymer of ethylene and octene-1, available as ENGAGE 8401 Polyolefin Elastomer from The Dow Chemical Company, Midland, Mich.

Material I:

Nonwoven Mat: Polyolefin nonwoven material prepared essentially as described in Example 1 of U.S. Pat. No. 6,133,173 (Riedel et al.), except that the feedblock assembly mentioned in Example 1 was fed by two polymer melt streams, one being a melt stream of the PSA described in Example 3 at 200° C., and the other being a melt stream of Materials G and H (which formed a polyolefin blend) at a weight ratio of 20/80, to obtain a mat thickness of 10 mm. The gear pumps of Example 1 were adjusted to produce a 20/80 ratio of PSA to polyolefin blend. The resulting nonwoven mat had a basis weight of about 3200 g/m².

Material J:

Porous Silica Material: Expanded perlite powder, mean particle size of about 0.5 millimeter, available as Ryolex™ Grade 3-S from Silbrico Corporation, Hodgkins, Ill.

Material K:

Polymeric Microspheres; Expancel™ 091 DE 80d30 microspheres (acrylic copolymer encapsulating isopentane), average diameter=75 micrometers, available from Eka Chemicals Inc., Expancel, Duluth, Ga.

Material L:

Acrylate Adhesive Isobutyl acrylate/isooctyl acrylate (IBA/IOA) 50/50 copolymer adhesive, made essentially as described in Example 3 of U.S. Pat. No. 5,708,110 (Bennett et al.), except using a monomer ratio of 1:1 IBA/IOA.

Material M:

Porous Composite Material No. 1: Mixture of Acrylate Adhesive (Material L) and Porous Silica Material (Material J) in a 90/10 weight percent ratio; prepared by combining the materials and mixing manually with a wooden stick for about 5 minutes, pressing the resulting mixture into a sheet of about 5 mm thickness between two polyethylene terephthalate (PET) liners, and then curing the resulting structure by ultraviolet (UV) irradiation of both sides of the structure for about 2 hours.

Material N:

Porous Composite Material No. 2: Mixture of Acrylate Adhesive (Material L) and Polymeric Microspheres (Material K); prepared by combining the materials in a 93/7 weight percent ratio and mixing manually with a wooden stick for 5 minutes, pressing the resulting mixture into a sheet of about 8 mm thickness between two PET liners, and then curing the resulting structure by UV irradiation of both sides of the structure for about 2 hours.

Example 1

A six-layer structure was constructed by assembling alternating layers of Nonwoven Mat (Material I) and Aluminum No. 1 (Material D). The transmission loss performance of the resulting structure (IDIDID) and the speeds of longitudinal sound wave of the component materials were measured by following the procedures described above. The resulting longitudinal speeds ($c_1$) of the component materials, as well as their thicknesses (d) and densities ($\rho$), were used to calculate (using an analytical model described by J. M. Bendickson and J. P. Dowling in "Analytical expressions for the electromagnetic mode density in finite, one-dimensional, photonic band-gap structures," Physical Review E, Volume 53, Number 4, pages 4107-4121 (1996)) the expected band gap profiles for the six-layer structure. (Parameters used for calculations: Nonwoven Mat: $C_1$=200 m/s, $\rho$=260 kg/m$^3$, d=10 mm; Aluminum No. 1: $C_1$=6342 m/s, $\rho$=2799 kg/m$^3$, d=0.5 mm.)

Figure 1B:
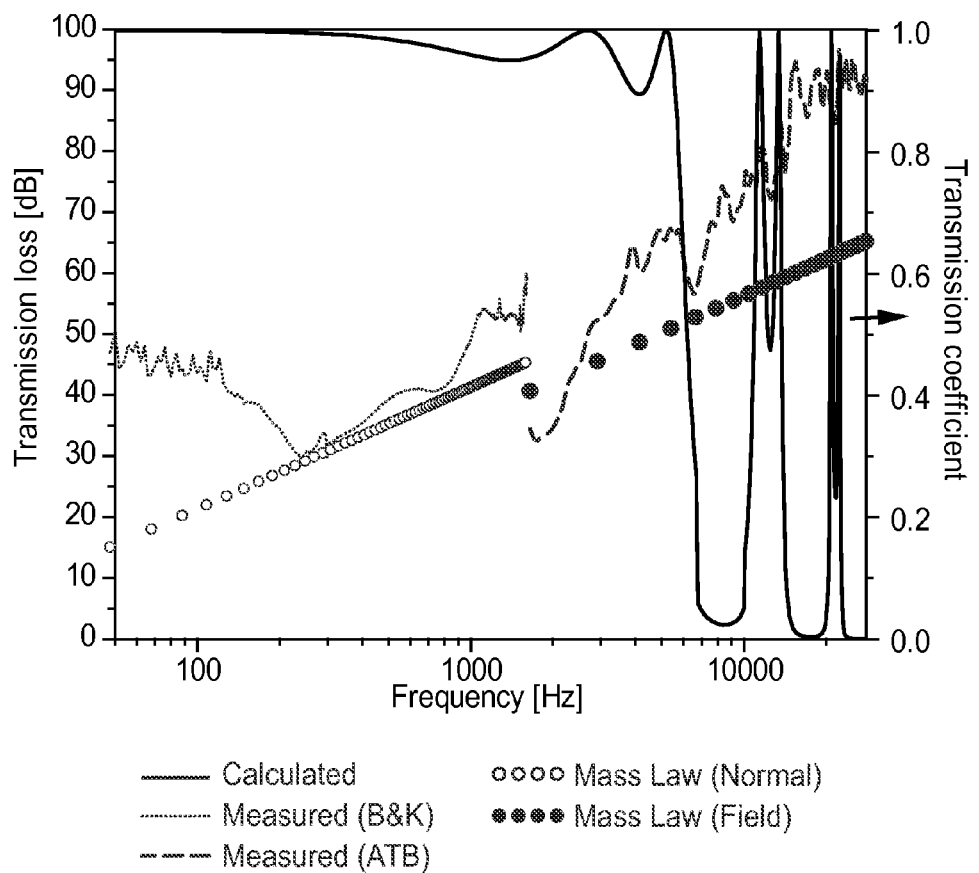

Finally, based on the measured weight per unit area of the structure, normal (for the B&K data) and field incidence (for the ATB Box data) mass law values were also calculated according to the following formula (see, for example, R. F. Barron, "Industrial Noise Control and Acoustics," Marcel Dekker, Inc., New York (2003), p. 112, 113):

$$TL_n = 10\log_{10}\left[1 + \left(\frac{\pi f M_s}{\rho_1 c_1}\right)^2\right]$$
$$TL_f = TL_n - 5$$

where $TL_n$ and $TL_f$ are, respectively, the normal and field incidence transmission losses (in dB), $\log_{10}$ is the logarithm to the base 10, $\pi$ is the mathematical constant equal approximately to 3.14, $M_s$ is the multi-layer structure mass per unit area (in kg/m$^2$), $\rho_1$ and $c_1$ are the density (in kg/m$^3$) and speed of sound (in m/s), respectively, in the air surrounding the multi-layer structure, and f is the frequency (in Hz). The resulting calculated and/or measured transmission loss/transmission coefficient versus frequency curves are shown in FIGS. 1a and 1b.

Example 2

A six-layer structure was constructed by assembling alternating layers of Polyethylene (PE) Foam No. 2 (Material B) and Aluminum No. 1 (Material D). The transmission loss performance of the resulting structure (BDBDBD) and the speeds of longitudinal sound wave of the component materials were measured by following the procedures described above. The resulting longitudinal speeds ($c_1$) of the component materials, as well as their thicknesses (d) and densities ($\rho$), were used to calculate (using an analytical model described by J. M. Bendickson and J. P. Dowling in "Analytical expressions for the electromagnetic mode density in finite, one-dimensional, photonic band-gap structures," Physical Review E, Volume 53, Number 4, pages 4107-4121 (1996)) the expected band gap profiles for the six-layer structure. (Parameters used for calculations: PE Foam No. 2: $C_1$=310 m/s (a selected conservative value, as a speed of 268 m/s had been measured), $\rho$=50 kg/m$^3$, d=9.53 mm; Aluminum No. 1: $C_1$=6342 m/s, $\rho$=2799 kg/m$^3$, d=0.5 mm.)

Figure 2A:
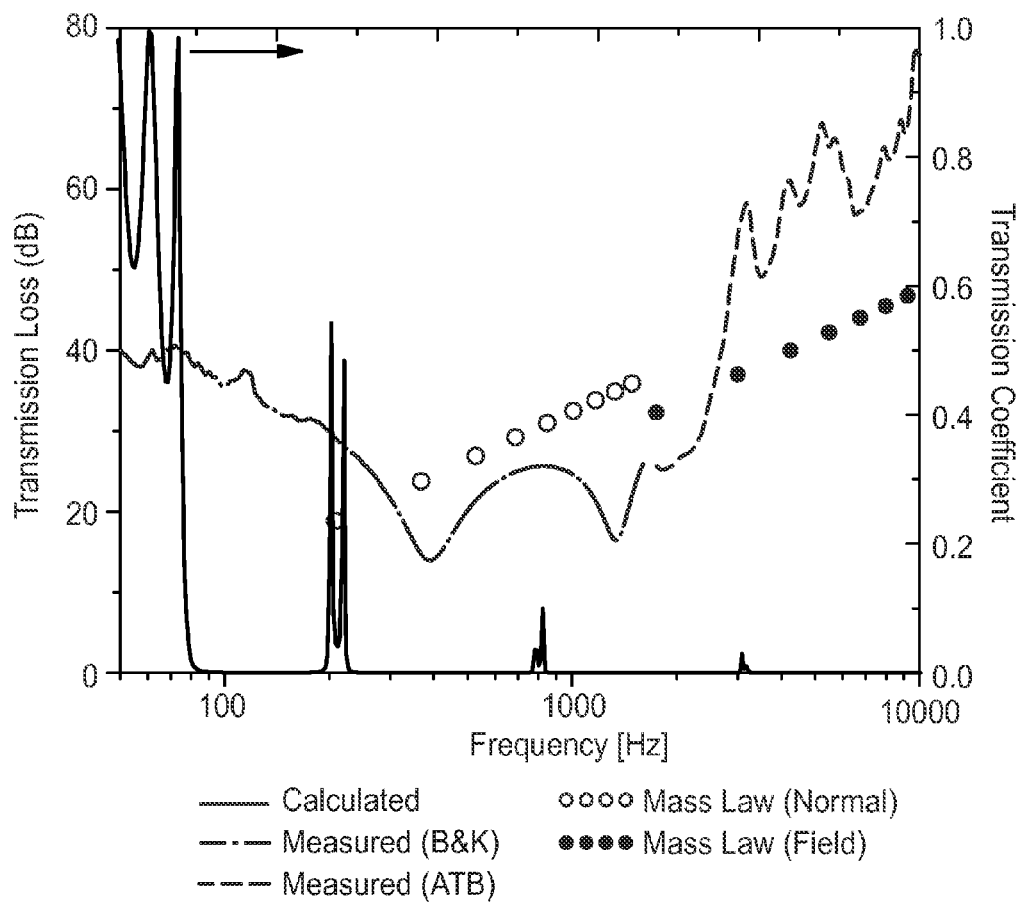
FIGS. 2a and 2b are plots of transmission loss (in dB; measured and theoretical mass law values) and transmission coefficient (calculated) versus frequency (in Hz) for the embodiment of the sound barrier of the invention described in Example 2.
Figure 2B:
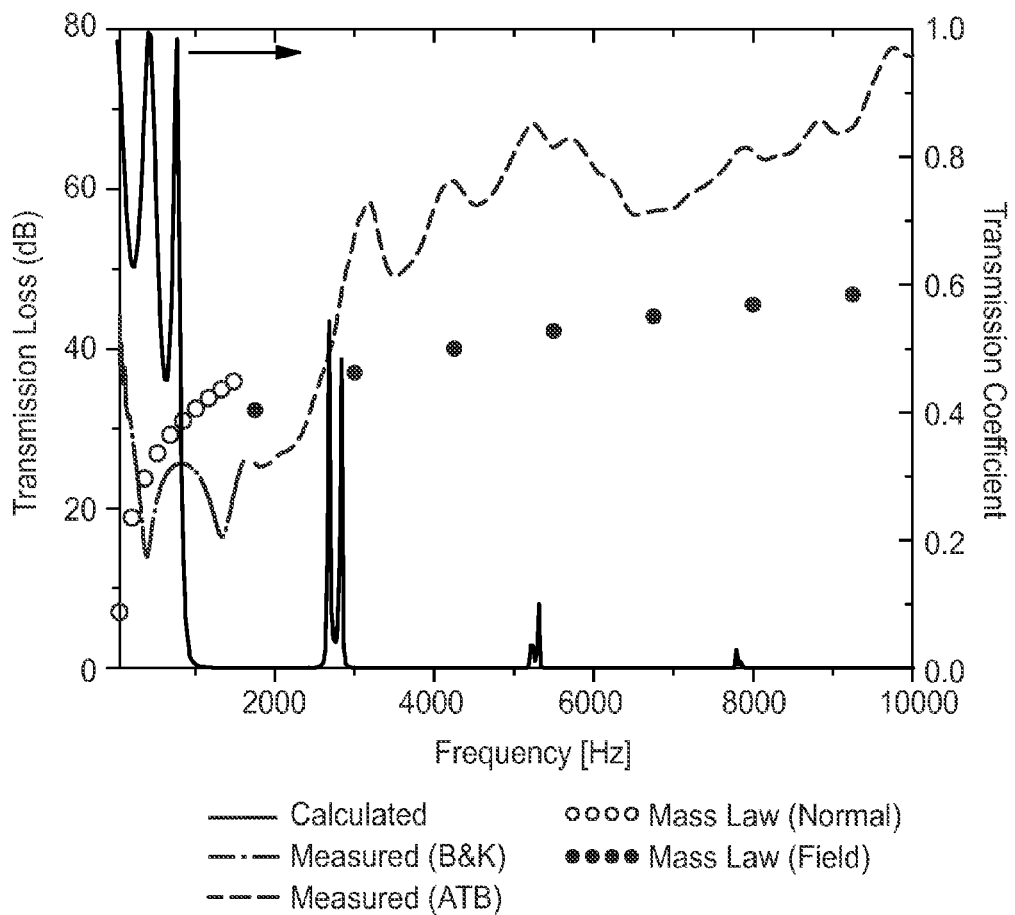

Finally, based on the measured weight per unit area of the structure, normal (for the B&K data) and field incidence (for the ATB Box data) mass law values were also calculated, as described above in Example 1. The resulting calculated and/or measured transmission loss/transmission coefficient versus frequency curves are shown in FIGS. 2a and 2b.

Examples 3 and 4

Figure 3A:
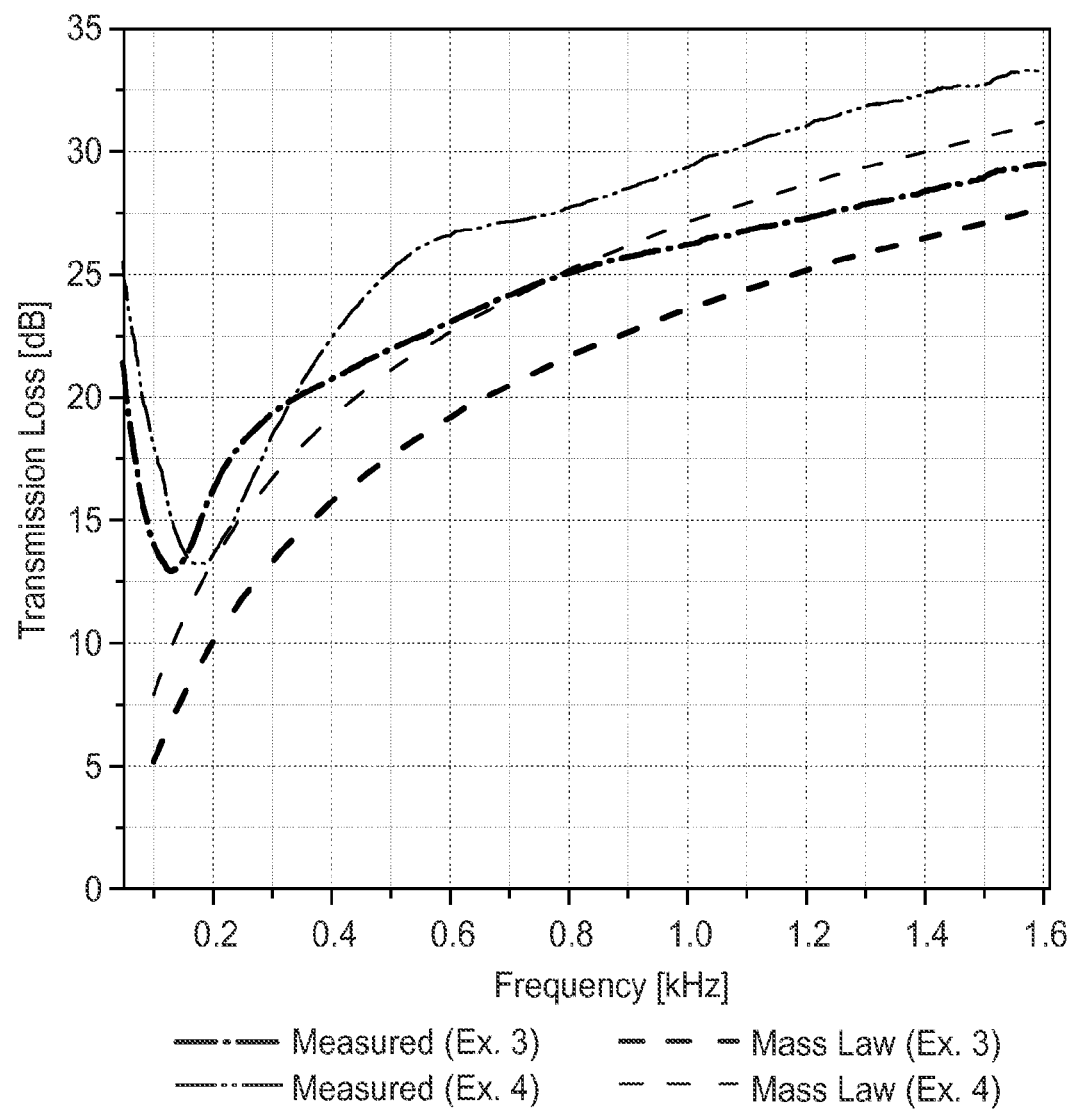
FIGS. 3a and 3b are plots of transmission loss (in dB; measured and theoretical mass law (normal incidence in 3a; field incidence in 3b) values) versus frequency (in kHz) for the embodiments of the sound barrier of the invention described in Examples 3 and 4.
Figure 3B:
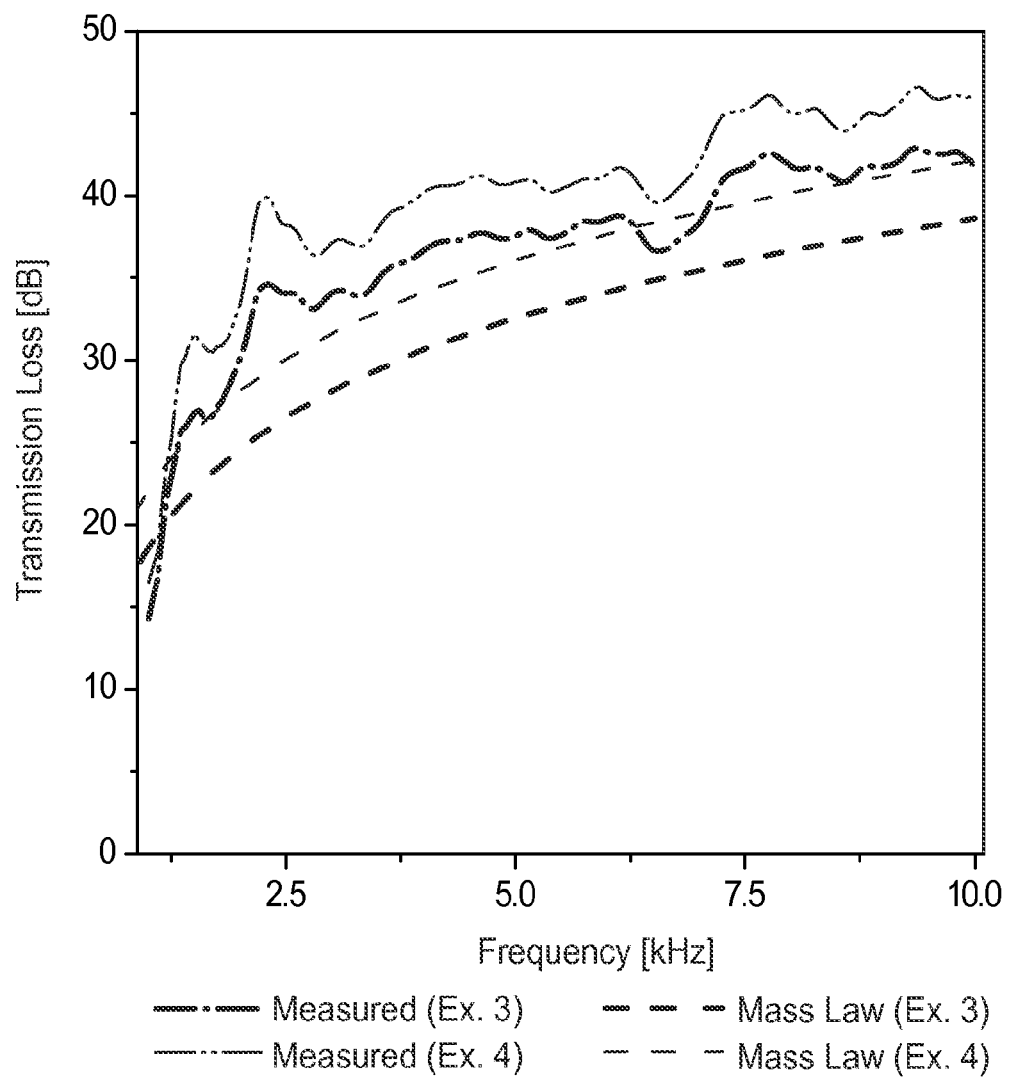

Three-layer and five-layer structures were constructed by assembling alternating layers of VHB Foam (Material C) and Aluminum No. 2 (Material E). The transmission loss performance of the resulting structures (CEC as Example 3 and CECEC as Example 4) was measured by following the procedures described above. Finally, based on the measured weights per unit area of the structures, normal (for the B&K data; FIG. 3a) and field incidence (for the ATB Box data; FIG. 3b) mass law values were also calculated, as described above in Example 1. The resulting calculated and measured transmission loss versus frequency curves are shown in FIGS. 3a and 3b.

Example 5 and Comparative Example 1

Figure 4A:
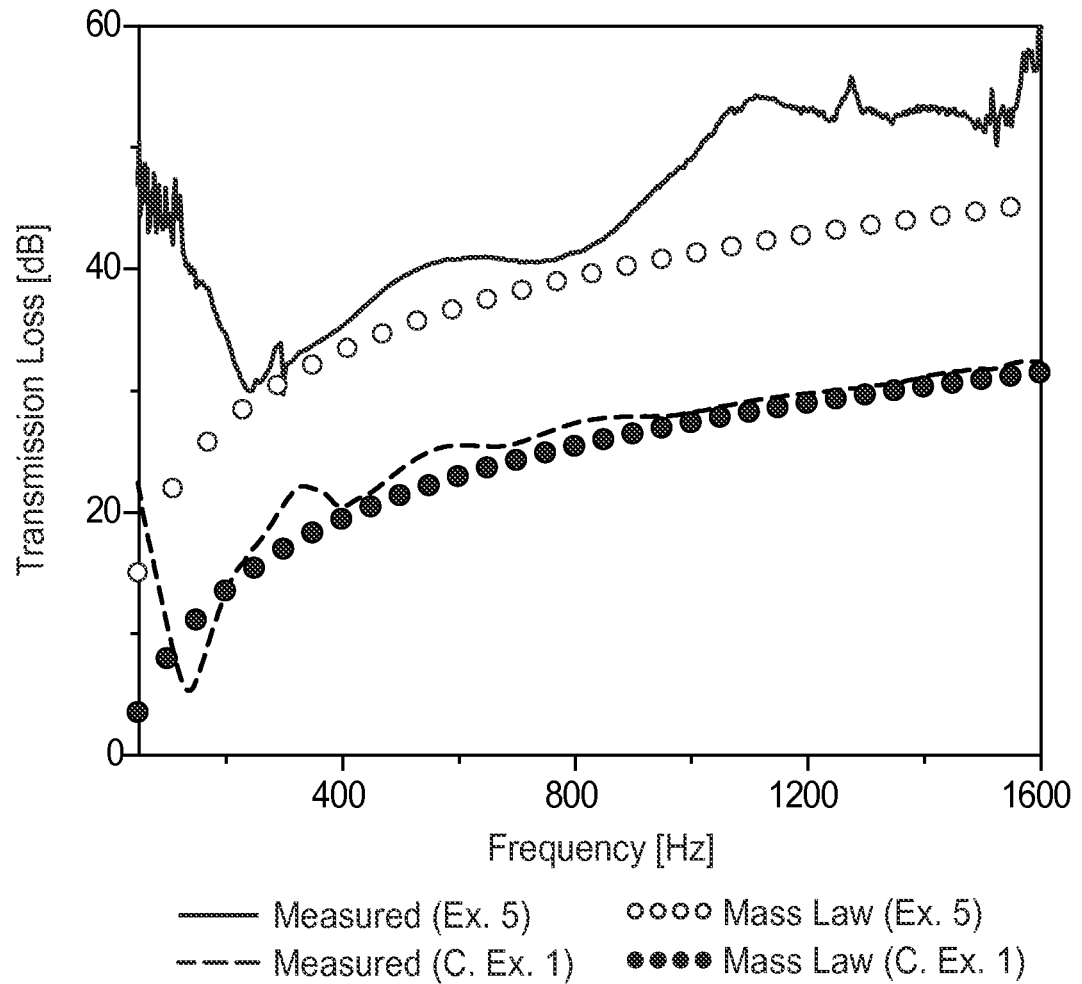
FIGS. 4a and 4b are plots of transmission loss (in dB; measured and theoretical mass law (normal incidence) values) versus frequency (in Hz) for the comparative sound barrier described in Comparative Example 1 and for the embodiment of the sound barrier of the invention described in Example 5.
Figure 4B:
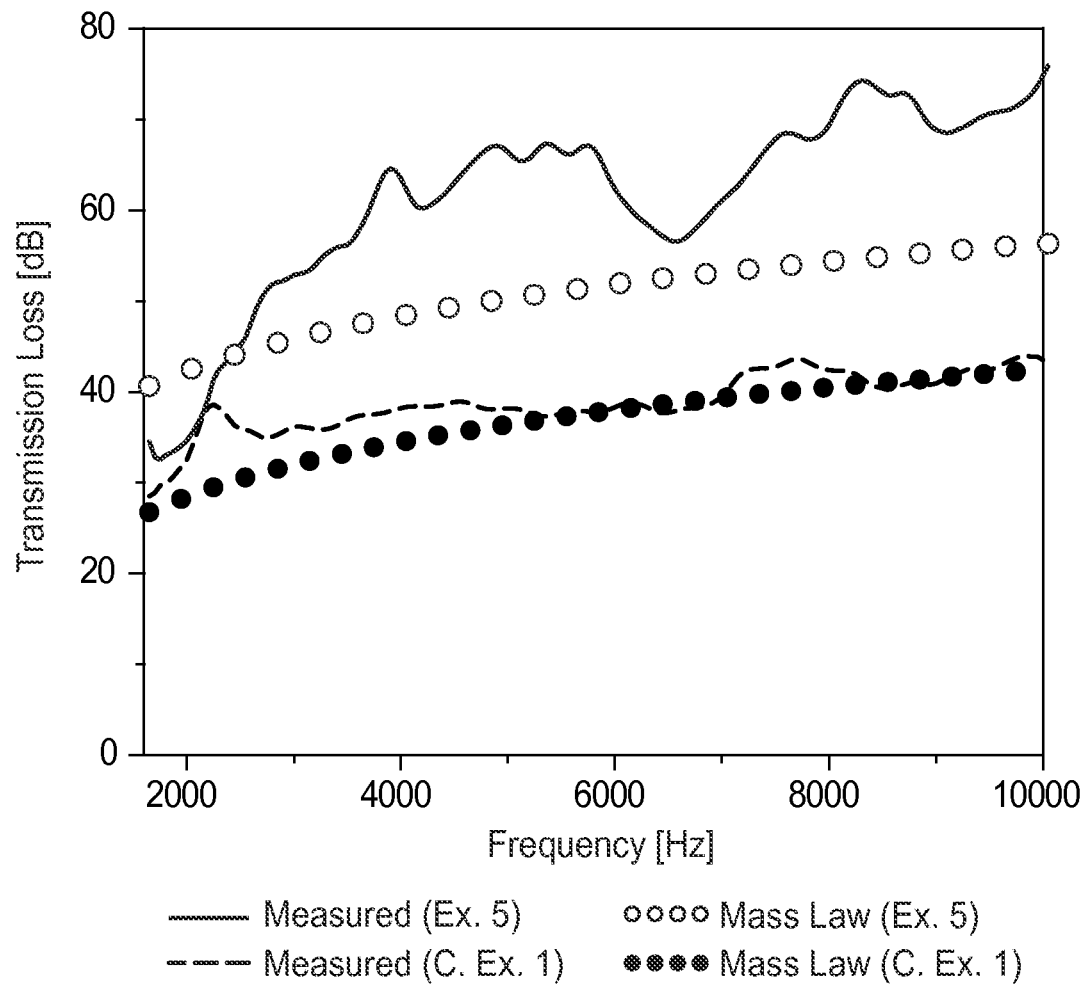

Two different multi-layer structures were constructed by assembling alternating layers of Silicone Rubber (Material F) and Aluminum No. 2 (Material E) as Comparative Example 1 (a five-layer structure), and alternating layers of Nonwoven Mat (Material I) and Aluminum No. 1 (Material D) as Example 5 (a six-layer structure). The transmission loss performance of the resulting structures (FEFEF and IDIDID) was measured by following the procedures described above. Finally, based on the measured weights per unit area of the structures, normal incidence mass law values were also calculated, as described above in Example 1. The resulting calculated and measured transmission loss versus frequency curves are shown in FIGS. 4a and 4b (primarily for comparison of their relative transmission loss performances to their respective mass laws).

Examples 6 and 7

Two different three-layer structures were constructed by assembling alternating layers of Acrylate Adhesive (Material L) and Porous Composite Material No. 1 (Material M) as Example 6, and alternating layers of Acrylate Adhesive (Material L) and Porous Composite Material No. 2 (Material N) as Example 7. The speeds of sound of the resulting structures (LML and LNL) were measured by following the procedures described above, and the results were found to be 288 m/s for Example 6 and 276 m/s for Example 7.

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows:

We claim:

1. A sound barrier comprising a substantially periodic array of structures disposed in a first medium having a first density, said structures being made of a second medium having a second density different from said first density, wherein one of said first and second media is a porous medium other than a porous metal, said porous medium having pores and a porosity of at least 0.02, and wherein the other of said first and second media is a viscoelastic or elastic medium.

2. The sound barrier of claim 1, wherein said porous medium is a multi-phase material that comprises a solid matrix material comprising vacuum-or fluid-containing pores.

3. The sound barrier of claim 2, wherein said pores are at least partially filled with at least one gas.

4. The sound barrier of claim 3, wherein said gas is selected from air, water vapor, nitrogen, carbon dioxide, and combinations thereof.

5. The sound barrier of claim 2, wherein said solid matrix material comprises a viscoelastic or elastic material or a combination thereof.

6. The sound barrier of claim 5, wherein said viscoelastic or elastic material exhibits a steady shear creep compliance of less than $10^{-6}$ Pa$^{-1}$.

7. The sound barrier of claim 5, wherein said solid matrix material is selected from inorganic materials; cured, glassy, or crystalline polymer resins; crosslinked elastomers; thermoplastic polymers; and combinations thereof.

8. The sound barrier of claim 1, wherein said porous medium is selected from polymer foams, polymeric nonwoven materials, porous silica materials, porous composite materials, and combinations thereof.

9. The sound barrier of claim 1, wherein said porous medium has a porosity of 0.02 to 0.65.

10. The sound barrier of claim 1, wherein said viscoelastic or elastic medium has a porosity of less than 0.02.

11. The sound barrier of claim 1, wherein said other of said first and second media is a viscoelastic medium.

12. The sound barrier of claim 1, wherein said viscoelastic medium is selected from viscoelastic solids, viscoelastic liquids, and combinations thereof.

13. The sound barrier of claim 12, wherein said viscoelastic solids and said viscoelastic liquids are selected from rubbery polymer compositions and combinations thereof.

14. The sound barrier of claim 1, wherein said other of said first and second media is an elastic medium.

15. The sound barrier of claim 1, wherein said substantially periodic array of structures is a one-dimensional array in the form of a multi-layer structure comprising alternating layers of said first and second media.

16. The sound barrier of claim 15, wherein said multi-layer structure comprises alternating layers of a porous medium and an elastic medium, said porous medium being selected from polymer foams, polymeric nonwoven materials, porous silica materials, porous composite materials, and combinations thereof, and said elastic medium being selected from metals, metal alloys, glassy polymers, composite materials, and combinations thereof.

17. The sound barrier of claim 16, wherein said porous medium is selected from closed-cell polymer foams, polymeric nonwoven materials, porous silica materials, and combinations thereof; and said elastic medium is selected from copper, aluminum, copper alloys, aluminum alloys, epoxy resins, and combinations thereof.

18. The sound barrier of claim 15, wherein said multi-layer structure comprises from 3 to 20 alternating layers of a porous material having a layer thickness of 5 mm to 10 mm and an elastic material having a layer thickness of 0.025 to 1 mm, said multi-layer structure having dimensions in the range of 5 mm to 100 mm.

19. The sound barrier of claim 1, wherein said sound barrier provides a transmission loss that is greater than or equal to 20 dB across the range of 800 Hz to 1500 Hz and has all dimensions less than or equal to 20 cm in size.

20. A process for preparing a sound barrier comprising (a) providing a first medium having a first density; (b) providing a second medium having a second density that is different from said first density; and (c) forming a substantially periodic array of structures disposed in said first medium, said structures being made of said second medium; wherein one of said first and second media is a porous medium other than a porous metal, said porous medium having pores and a porosity of at least 0.02, and wherein the other of said first and second media is a viscoelastic or elastic medium.

* * * * *